United States Patent
Yamaguchi et al.

(10) Patent No.: US 6,885,508 B2
(45) Date of Patent: Apr. 26, 2005

(54) IMAGE PICKUP LENS, IMAGE PICKUP UNIT AND CELLPHONE TERMINAL EQUIPPED THEREWITH

(75) Inventors: Susumu Yamaguchi, Hachioji (JP); Masae Sato, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/691,676

(22) Filed: Oct. 23, 2003

(65) Prior Publication Data

US 2004/0105173 A1 Jun. 3, 2004

(30) Foreign Application Priority Data

Oct. 28, 2002 (JP) ........................................ 2002-312344

(51) Int. Cl.⁷ ................................................ G02B 3/02
(52) U.S. Cl. ..................................................... 359/717
(58) Field of Search ............................... 359/717, 718, 359/719

(56) References Cited

U.S. PATENT DOCUMENTS

| | | | | |
|---|---|---|---|---|
| 5,329,403 A | * | 7/1994 | Fukasawa | .................... 359/717 |
| 5,677,798 A | | 10/1997 | Hirano et al. | ................ 359/676 |
| 5,739,965 A | * | 4/1998 | Ohno | .......................... 359/753 |
| 2002/0012176 A1 | | 1/2002 | Ning | ........................... 359/794 |
| 2003/0048549 A1 | | 3/2003 | Sato | ............................ 359/794 |
| 2004/0036983 A1 | * | 2/2004 | Ninomiya et al. | ........... 359/719 |

FOREIGN PATENT DOCUMENTS

| | | |
|---|---|---|
| JP | 04-211214 | 8/1992 |
| JP | 2000-066094 | 3/2000 |
| JP | 2002-296496 | 10/2002 |

* cited by examiner

Primary Examiner—Georgia Epps
Assistant Examiner—M. Hasan
(74) Attorney, Agent, or Firm—Cohen, Pontani, Lieberman & Pavane

(57) ABSTRACT

An image pickup lens that has therein, in the order named from an object side, an aperture stop, a meniscus-shaped first lens having positive refracting power whose convex surface faces an object and a second lens having positive or negative refracting power whose convex surface faces the object, wherein each of the first lens and the second lens has at least one aspheric surface and satisfies the following condition expression $f1/|f2|<1.0$ wherein, f1 is a focal length of the first lens, f2 is a focal length of the second lens and f is a focal length of the entire system of the image pickup lens.

11 Claims, 9 Drawing Sheets

FIG. 3 (b)
FIG. 3 (a)
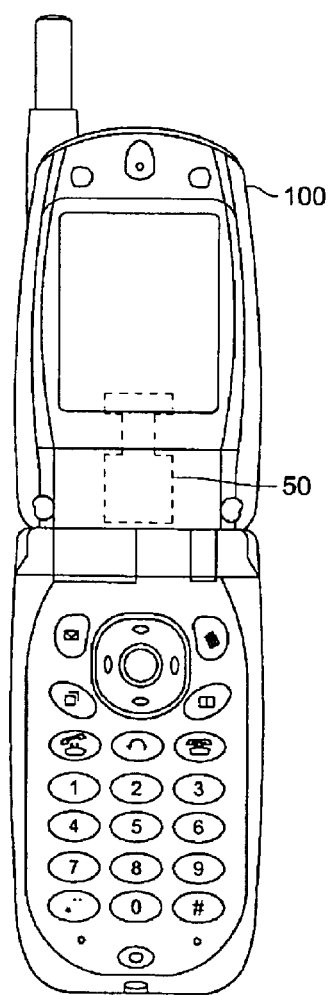
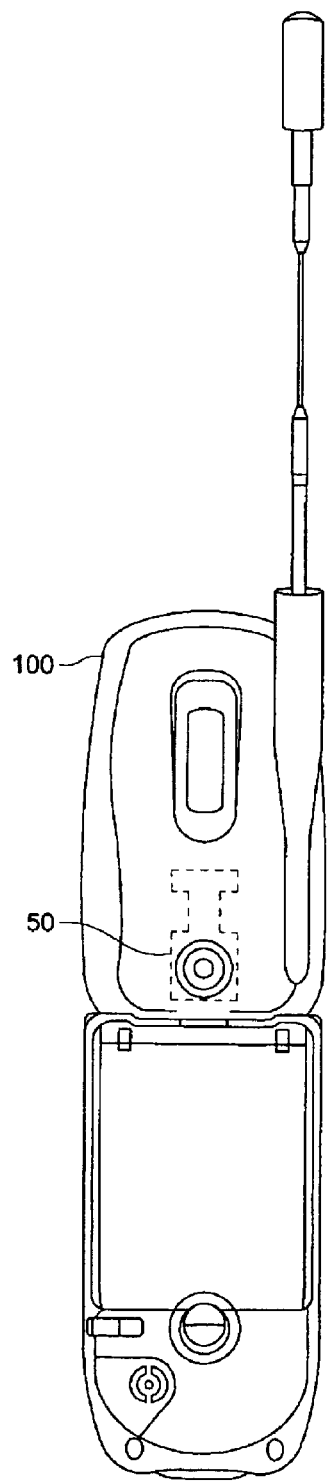

MERIDIONAL COMA

IMAGE PICKUP LENS, IMAGE PICKUP UNIT AND CELLPHONE TERMINAL EQUIPPED THEREWITH

BACKGROUND OF THE INVENTION

The present invention relates to a small-sized image pickup lens employing, an image pickup unit and a cellphone terminal equipped with the small-sized image pickup lens and the image pickup unit, employing a solid-state image sensor such as a solid-state image sensor of a CCD type or a solid-state image sensor of a CMOS type.

With high efficiency and downsizing of an image pickup unit employing a solid-state image sensor such as an image sensor of a CCD (Charge Coupled Device) type or an image sensor of a CMOS (Complementary Metal Oxide) type, a cellphone and a personal computer each being provided with the image pickup unit are spreading in recent years. In addition, a demand for further downsizing of the image pickup lens equipped on each of these image pickup units is increasing.

A two-element lens capable of being improved to be of the higher efficiency compared with a single lens is generally fit for the image pickup lens to be used for the aforesaid application, and there is known a positive-lens-preceding two-element image pickup lens wherein a positive lens is arranged to be closest to an object because of a demand for downsizing of a total lens length. The image pickup lens having the aforementioned structure is disclosed, for example, in the Japanese Patents Nos. 3,007,695 and 3,311,317.

There has been a problem in the lens of the type described in the patent official report mentioned above that an angle of view in the diagonal direction of a solid-state image sensor is as small as 52° to be slightly small as an image pickup lens to be used for a camera-fitted cellphone, although its f-number is as great as 2.0 and downsizing of the total lens length is achieved.

SUMMARY OF THE INVENTION

In view of the problems stated above, an object of the invention is to provide a small-sized image pickup lens wherein the f-number is about 2.8, an angle of view in the diagonal direction of an effective image area of a solid-state image sensor is 58° or more and various aberrations are corrected satisfactorily in spite of a simple structure with two lenses, an image pickup unit and a cellphone terminal.

The aforesaid object is attained by either one of the following Structures (1)–(11).

Structure (1): An image pickup lens that has therein, in the order named from an object side, an aperture stop, a meniscus-shaped first lens having positive refracting power whose convex surface faces an object and a second lens having positive or negative refracting power whose convex surface faces the object, wherein each of the first lens and the second lens has at least one aspheric surface and satisfies the following conditional expression;

$$|f1/f2|<1.0 \tag{1}$$

wherein, f1 is a focal length of the first lens, f2 is a focal length of the second lens and f is a focal length of the entire system of the image pickup lens.

With respect to the size of a small-sized image pickup lens, a target of the present structure is a small size in the level that satisfies the following expression (8). By satisfying this range, it is possible to make the total length of the image pickup lens to be short and to make an outside diameter of the lens to be small synergistically. Due to this, the total image pickup unit can be made small in size and light in weight;

$$L/2Y<1.30 \tag{8}$$

wherein, L represents a distance from a lens surface closest to an object to an image-side focal point on the optical axis of the total image pickup lens system (which, however, is a distance from an aperture stop to an image-side focal point when the aperture stop is arranged to be closest to an object), and 2Y represents a length of a diagonal line on an image pickup surface of a solid-state image sensor (a length of a diagonal line on a practical rectangle pixel area of a solid-state image sensor).

In this case, the image-side focal point means an image point in the case where parallel rays which are in parallel with an optical axis enter the lens. When a parallel flat plate is arranged between the surface of the lens closest to the image and the image-side focal point, a thickness of a parallel flat plate portion is assumed to have a distance equivalent to an air space.

In the basic structure of the invention for obtaining a small-sized image pickup lens in which aberrations are corrected satisfactorily, an aperture stop is arranged to be closest to an object, and a meniscus-shaped positive first lens whose convex surface faces the object and a positive or negative second lens whose convex surface faces the object constitute the image pickup lens. By making the positive first lens to be in a meniscus shape where the convex surface faces an object, the principal point of the total system of the image pickup lens can be moved to be closer to an object, and thereby, the total length of the image pickup lens satisfying conditional expression (8) can be downsized. Further, by arranging an aperture stop to be closest to an object and by making an object-side surface of the second lens to be convex toward the object side, telecentric characteristics of an image-side light flux necessary for the image pickup lens that employs a charge coupled device can be secured easily.

Further, by providing at least one aspheric surface on each of the first lens and the second lens, it is possible to correct aberration more satisfactorily. An aspheric surface provided on the positive first lens is effective for correction of spherical aberration and coma. On the other hand, since the second lens is arranged to be away from an aperture stop to be closest to an image, there is a difference in the height of passage between an axial light flux and an off-axis light flux, and when an aspheric surface is used, various aberrations on a peripheral portion of the image area such as curvature of the field and distortion can be corrected satisfactorily.

The conditional expression (1) relates to a focal length of each of the first lens and the second lens, and when this condition is satisfied, the principal point of the entire image pickup lens system can be brought near to an object, which can contribute to shortening of the total length of the image pickup lens. Incidentally, it is more preferable to satisfy the following expression (1').

$$|f1/f2|<0.8 \tag{1'}$$

Structure (2): The image pickup lens that is characterized to satisfy the following conditional expressions;

$$0.80<f1/f<1.80 \tag{2}$$

$$-1.90<R2/((1-N1)\cdot f)<-0.60 \tag{3}$$

wherein, f1 represents a focal length of the first lens, R2 represents a radius of curvature of the image-side surface of the first lens, N1 represents a refractive index of the first lens for d line, and f represents a focal length of the total image pickup lens system.

In this case, conditional expression (2) prescribes conditions for setting the refracting power of the first lens properly. When f1/f exceeds the lower limit, positive refracting power of the first lens does not become greater than is needed, and it is possible to control high-order spherical aberration and coma which are caused on the surface of the first lens closer to an object to be small. On the other hand, when f1/f is lower than the upper limit, it is possible to secure the positive refracting power of the first lens properly and the total image pickup lens length can be shortened. Incidentally, it is more preferable to satisfy the following expression (2').

$$1.00 < f1/f < 1.60 \tag{2'}$$

Further, conditional expression (3) prescribes conditions for setting the negative refracting power of the image-side surface of the first lens properly. By satisfying the conditions, correction of the curvature on the image surface is easy and thereby, it is possible to make the image surface to be flat. Since a focal length of the first lens on the image side is calculated from R2/(1−N1) by using radius of curvature (R2) and refractive index (N1) of the first lens, the conditional expression (3) is an expression showing the ratio of a focal length of the second lens on the object side to that of the total image pickup lens system. To be more concrete, when R2/((1−N1)·f) exceeds the lower limit, negative refracting power of the first lens on the image side can be kept properly, and thereby, positive Petzval sum is reduced, and a curvature of the field can be corrected easily. On the other hand, when R2/((1−N1)·f) is lower than the upper limit, negative refracting power of the first lens on the image side does not become greater than is needed, and it is possible to control generation of coma flare of an off-axis light flux and of pincushion distortion, thus, excellent image quality can be obtained. Incidentally, it is more preferable that the following expression (3') is satisfied.

$$-1.70 < R2/((1-N1) \cdot f) < -0.80 \tag{3'}$$

Structure (3): The image pickup lens wherein the second lens has positive refracting power. By making the second lens to be a positive lens, telecentric characteristics on the peripheral portion on the image area can be secured more easily in the structure.

Structure (4): The image pickup lens according to either one of the Structures 1–3 wherein an image-side surface of the second lens has thereon an aspheric surface satisfying the following conditional expression at optional height h in the direction perpendicular to the optical axis satisfying h max×0.7<h<h max when h max represents the maximum effective radius;

$$X - X0 < 0 \tag{4}$$

wherein, X and X0 are values calculated by the following expressions under the condition that a vertex of the surface represents the origin, an X axis is taken in the optical axis direction and h represents a height in the direction perpendicular to the optical axis.

In the above expression, X represents an amount of displacement of the aspheric surface, $$X = \frac{h^2/R4}{1+\sqrt{1-(1+K4)h^2/R4^2}} + \sum A_i h^i$$

and X0 represents an amount of displacement of rotation secondary curved surface of aspheric surface, $$X0 = \frac{h^2/R4}{1+\sqrt{1-(1+K4)h^2/R4^2}}$$

wherein, Ai represents i-order aspheric surface coefficient of the image-side surface of the second lens, R4 represents a radius of curvature of an image-side surface of the second lens and K4 represents a conic constant of an image-side surface of the second lens.

A shape of the aspheric surface satisfying the aforementioned conditional expression (4) makes it easy to secure telecentric characteristics in a light flux having a high angle of view, in particular.

Structure (5): The image pickup lens wherein the first lens and the second lens are made of plastic materials.

With a target of downsizing the total image pickup unit, there has recently been developed an image pickup unit wherein a pixel pitch is small even when the number of pixels of the solid-state image sensor is the same and a size of an image area of an image pickup surface (photoelectric conversion portion) is small as a result. In the image pickup lens for the image pickup sensor with a small image area size, a focal length of the total system needs to be short for securing the same angle of view, and therefore, a radius of curvature and an outside diameter of each lens are compelled to be small. Therefore, in the case of a glass lens manufactured through grinding, the processing is difficult. Accordingly, if each of the first lens and the second lens is composed of a plastic lens manufactured through injection molding, it is possible to manufacture on a mass production basis even when a radius of curvature and an outside diameter are small. Further, it is easy to convert to an aspheric surface, which is advantageous also for aberration correction. Now, as a lens which can be manufactured relatively easily despite a small diameter lens, introduction of a glass molded lens is considered. Under the present technology, however, a plastic lens seems to be more suitable than a glass molded lens for mass production wherein manufacturing cost is controlled, because of a problem of durability of a metal mold for the glass molded lens.

Further, another merit for using a plastic lens is that a shape of a flange portion outside a lens effective diameter can be designed freely, and therefore, it is possible to take a structure to make optical axes of two lenses to agree with each other easily, by using an inside diameter or an outside diameter of the flange portion (annular portion) as shown in FIG. 2 which is referred in the explanation made later. In the present example, the flange portion has a function of a spacer to prescribe a lens distance, which is preferable for reduction of the number of parts in terms of the structure. Incidentally, "formed by plastic materials" includes an occasion wherein antireflection coating and surface hardness improvement coating are conducted on the surface of base materials representing plastic materials.

Structure (6): An image pickup lens that has therein, in the order named from an object side, an aperture stop, a meniscus-shaped first lens having positive refracting power whose convex surface faces an object and a second lens having positive or negative refracting power whose convex surface faces the object, wherein the following conditional expression is satisfied;

$$0.40 < D_{24}/f < 1.00 \quad (5)$$

wherein, $D_{24}$ represents a distance from the image-side surface of the first lens to that of the second lens, and f represents a focal length of the total image pickup lens system, and an image-side surface of the second lens has thereon an aspheric surface satisfying the following conditional expression at optional height h in the direction perpendicular to the optical axis satisfying h max×0.7<h<×h max when h max represents the maximum effective radius;

$$X - X0 < 0 \quad (6)$$

wherein, X and X0 are values calculated by the following expressions under the condition that a vertex of the surface represents the origin, an X axis is taken in the optical axis direction and h represents a height in the direction perpendicular to the optical axis, and X represents an amount of displacement of the aspheric surface, $$X = \frac{h^2/R4}{1 + \sqrt{1 - (1+K4)h^2/R4^2}} + \sum A_i h^i$$

and X0 represents an amount of displacement of rotation secondary curved surface of aspheric surface, $$X0 = \frac{h^2/R4}{1 + \sqrt{1 - (1+K4)h^2/R4^2}}$$

wherein, Ai represents i-order aspheric surface coefficient of the image-side surface of the second lens, R4 represents a radius of curvature of an image-side surface of the second lens and K4 represents a conic constant of an image-side surface of the second lens.

In the basic structure of the invention for obtaining a small-sized image pickup lens in which aberrations are corrected satisfactorily, an aperture stop is arranged to be closest to an object, and a meniscus-shaped positive first lens whose convex surface faces an object and a positive or negative second lens whose convex surface faces the object constitute the image pickup lens. By making the positive first lens to be in a meniscus shape where the convex surface faces an object, the principal point of the total system of the image pickup lens can be moved to be closer to an object, and thereby, the total length of the image pickup lens satisfying the aforementioned conditional expression (8) can be downsized. Further, by arranging an aperture stop to be closest to an object and by making an object-side surface of the second lens to be convex toward the object side, telecentric characteristics of an image-side light flux necessary for the image pickup lens that employs a charge coupled device can be secured easily.

For securing telecentric characteristics of the image-side light flux, the conditional expression (5) prescribes the condition for optimizing distance $D_{24}$ between an image-side surface of the first lens and that of the second lens. In the lens of this type in the present Structure, when achieving both downsizing of the total length of the image pickup lens and securing of telecentric characteristics of an image-side light flux, it is necessary to lift an off-axis light flux up with an image-side surface of the first lens that acts negative refraction and to refracts the lifted light flux with an action of the convex surface on the object-side surface of the second lens and with an action of the aspheric surface on the image-side surface of the second lens so that the lifted light flux may turn out to be in parallel with an optical axis as far as possible.

To be more concrete, when $D_{24}/f$ is higher than the lower limit of the conditional expression (5), it is prevented that $D_{24}$ becomes too small. Due to this, it is possible to lift the off-axis light flux up without strengthening the negative power of the image-side surface of the first lens particularly, and therefore, off-axis aberration can be corrected satisfactorily while telecentric characteristics of the image-side light flux are secured. On the other hand, when $D_{24}/f$ is lower than the upper limit, it is prevented that $D_{24}$ becomes too large, and it is possible to downsize the total length of the image pickup lens while securing the necessary lens thickness and a back focus. Incidentally, it is preferable that the following expression (5') is satisfied.

$$0.50 < D_{24}/f < 0.80 \quad (5')$$

Further, a shape of the aspheric surface that satisfies the above-mentioned conditional expression (6) makes it easy to secure telecentric characteristics especially in a light flux having a large angle of view.

Structure (7): The image pickup lens that is characterized to satisfy the following conditional expression;

$$0.80 < f1/f < 1.80 \quad (7)$$

wherein, f1 represents a focal length of the first lens and f represents a focal length of the entire image pickup lens system.

The conditional expression (7) prescribes conditions for setting the refracting power of the first lens properly. When f1/f exceeds the lower limit, positive refracting power of the first lens does not become greater than is needed, and it is possible to control high-order spherical aberration and coma which are caused on the surface of the first lens closer to an object to be small. On the other hand, when f1/f is lower than the upper limit, it is possible to secure the positive refracting power of the first lens properly and the total image pickup lens length can be shortened. Incidentally, it is more preferable to satisfy the following expression (7').

$$1.00 < f1/f < 1.60 \quad (7')$$

Structure (8): The image pickup lens wherein the second lens has positive refracting power. The effect thereof is the same as that explained relating to the image pickup lens described in Structure (3).

Structure (9): The image pickup lens wherein the first lens and the second lens are made of plastic materials. The effect thereof is the same as that explained relating to the image pickup lens described in Structure (5).

Structure (10): An image pickup unit having therein a solid-state image sensor equipped with a photoelectric converting portion, the image pickup lens described in either one of Structures (1)–(9) that forms an object image on the photoelectric converting portion of the solid-state image sensor, a base board having a terminal for connecting with the outside holding the solid-state image sensor and conducting transmission and receiving of electric signals and a casing that is composed of a light-shielding member and has an opening through which a ray enters from an object, all formed integrally wherein, a height of the image pickup unit in the direction of an optical axis of the image pickup lens is not more than 10 mm.

By using the image pickup lens in the present Structure, the image pickup unit which is smaller in size and higher in performance can be obtained. In this case, "an opening through which a ray enters" is not always limited to a space such as a hole, but it means a portion where there is formed an area through which incident-light from an object can be transmitted. Further, "a height of the image pickup unit in the direction of an optical axis of the image pickup lens is not more than 10 mm" means a total length of the image pickup unit equipped with all the structures stated above in the direction of the optical axis. Therefore, in the occasion wherein a casing is provided on the surface of the base board and electronic parts are provided on the reverse side of the base board, a distance from the forefront end portion closer to an object of the casing to a forefront end portion of electronic parts protruding from the reverse side is not more than 10 mm.

Structure (11): A cellphone terminal that is characterized to be equipped with the image pickup unit described in Structure (10). By using the image pickup unit described in the Structure, the cellphone terminal which is smaller in size and higher in performance can be obtained.

BRIEF DESCRIPTION OF THE DRAWINGS

FIGS. 3(a) and 3(b) show front view and rear view, respectively, of cellphone 100 serving as a cellphone terminal equipped with image pickup unit 50.

DETAILED DESCRIPTION OF THE PREFERRED EMBODIMENT

Figure 1:
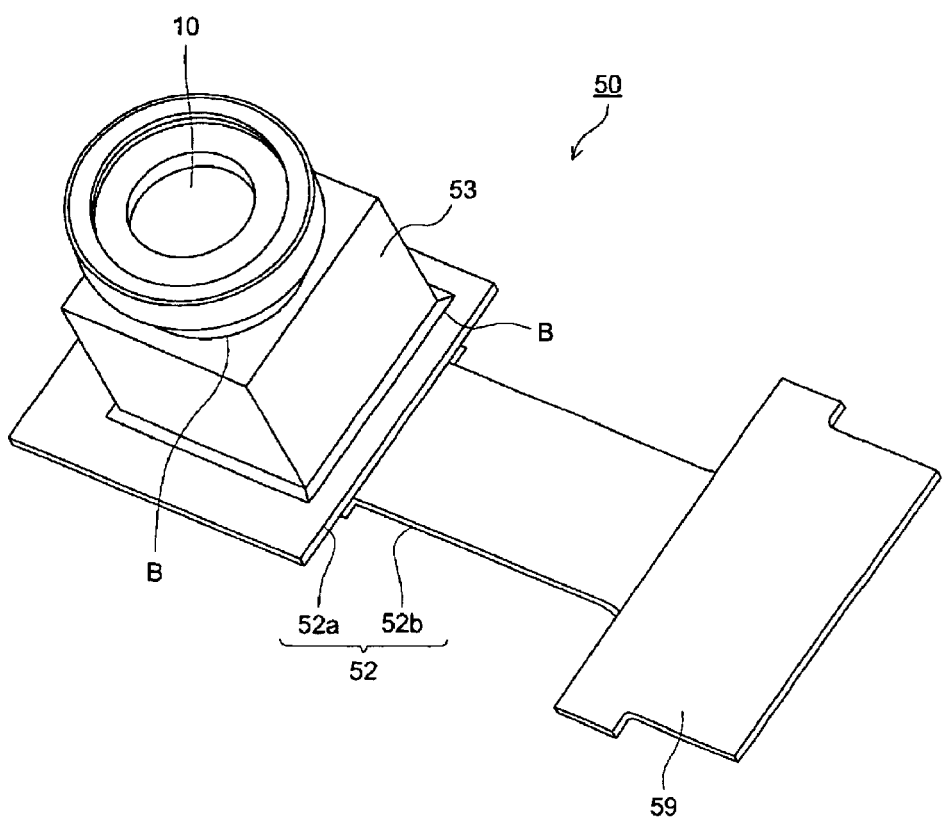
FIG. 1 is a perspective view of image pickup unit 50 relating to the present embodiment.

An embodiment of the invention will be explained as follows, referring to the drawings. FIG. 1 is a perspective view of image pickup unit 50 relating to the present embodiment, and FIG. 2 is a sectional view of the image pickup unit 50 in the direction of an optical axis of an image pickup optical system.

Figure 2:
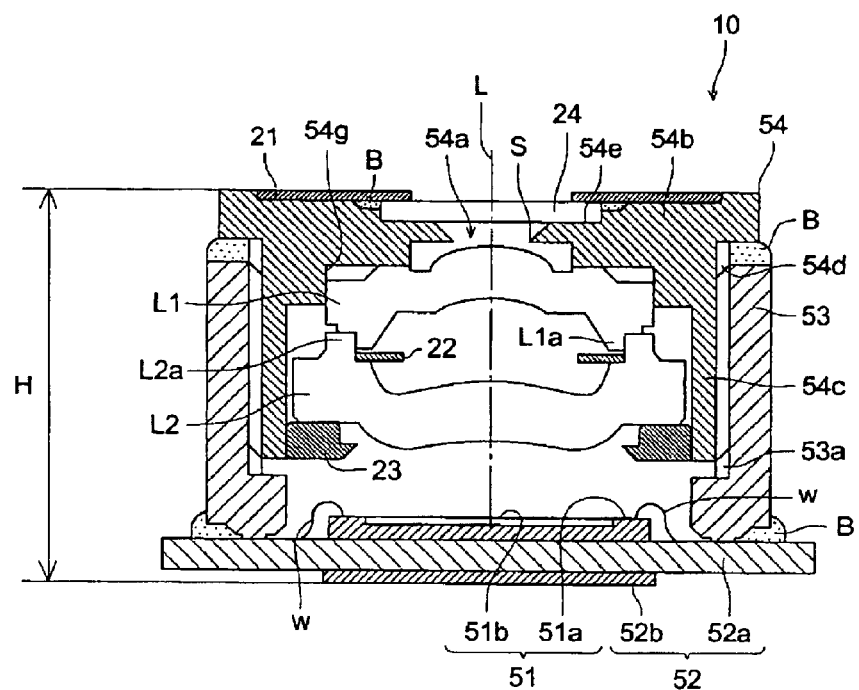
FIG. 2 is a sectional view of the image pickup unit 50 in the direction of an optical axis of an image pickup optical system.

Image pickup unit 50 shown in FIG. 1 has therein CMOS type image sensor 51 representing a solid-state image sensor equipped with a photoelectric converting portion (which is not shown in FIG. 1 but is shown in FIG. 2), image pickup optical system 10 that forms an object image on the photoelectric converting portion 51a of the image sensor 51 (including lens barrel 54), base board 52 having terminal 59 for holding the image sensor 51 and conducting transmission and receiving of electric signals and casing 53 that holds image pickup optical system 10 fixed on the base board 52, all formed integrally. Incidentally, "the image pickup lens" mentioned in the invention is composed of first lens L1 described later, second lens L2 and aperture stop S, in the present embodiment, "the casing" mentioned in the invention is composed of casing 53 and lens barrel 54 in the present embodiment, and opening portion 54a for rays to enter from an object is formed on the lens barrel 54.

As is shown in FIG. 2, on the image sensor 51, there is formed photoelectric converting portion 51a representing a light-receiving portion on which pixels (photoelectric converting elements) are arranged two-dimensionally at the central portion on a plane on the light receiving side, and in the neighborhood of photoelectric converting portion 51a, there is formed signal processing circuit portion 51b. This signal processing circuit portion 51b is composed of a drive circuit portion that drives each pixel successively and obtains signal charges, an A/D converting portion that converts a signal charge into a digital signal and a signal processing portion that forms an image signal output by using digital signals. Further, on the portion near the outer edge of the surface on the light-receiving side of the image sensor 51, there are arranged many pads (not shown) which are connected with base board 52 through wires W. The image sensor 51 converts signal charges coming from photoelectric converting portion 51a into image signals such as digital YUV signals, and outputs them to a prescribed circuit on the base board 52 through wires W. Here, Y represents luminance signals, U(=R−Y) represents a signal of color difference between red and luminance and V(=B−Y) represents a signal of color difference between blue and luminance. Incidentally, the image sensor is not limited to the image sensor of the CMOS type, and other ones such as CCD and others may also be used.

Base board 52 is composed of supporting flat plate 52a that supports on its one surface the aforesaid image sensor 51 and casing 53 and of flexible base board 52b whose one end portion is connected to the back (the surface opposite to the image sensor 51) of the supporting flat plate 52a. The supporting flat plate 52a has many signal transmission pads provided on both the surface and the reverse side thereof, and the pads are connected to wires W of the image sensor 51 on its one side, and are connected to the flexible base board 52b on the back side.

The flexible base board 52b is connected, on its one end portion, with the supporting flat plate 52a, then connects the supporting flat plate 52a with an outer circuit (for example, control circuit owned by the higher apparatus equipped with an image pickup unit) through outside output terminal 59 provided on the other end portion thereof, and makes it possible to receive supply of voltage and clock signals for driving image sensor 51 from an outer circuit, and to output digital YUV signals to an outer circuit. Further, a middle portion of the flexible base board 52b in its longitudinal direction is provided with flexibility or deformability, and its deformation gives a degree of freedom to the supporting flat plate 52a in terms of a direction and arrangement of the outside output terminal.

Next, casing 53 and image pickup optical system 10 will be explained as follows. The casing 53 is fixed, on the plane on which image sensor 51 is provided on supporting flat plate 52a of base board 52 through gluing under the condition that the image sensor 51 is housed in the image sensor 51. The image pickup optical system 10 is housed and held inside the casing 53. Incidentally, in FIG. 2, the upper part is an object side and a bottom part is an image side.

In FIG. 2, quadratic-prism-shaped casing 53 having a circular hole is placed at the position to enclose image sensor 51 on supporting flat plate 52a. On an inner circumferential surface of the circular hole of the casing 53, there is formed female screw 53a. Lens barrel 54 arranged inside the casing 53 has therein top plate 54b having opening portion 54a at the center thereof and cylinder portion 54c having, on its outer circumferential surface, male screw 54d. Each of the casing 53 and the lens barrel 54 is formed by a light-shielding member.

Light-shielding mask 21 having on its center an opening is fixed with adhesive on the top face of the top plate 54b of the lens barrel 54. IR cut filter 24 that blocks incidence of infrared radiation coming from an object is fixed with adhesive B on stepped portion 54e formed around the opening portion 54a on the top face of the top plate 54b. A diameter of the opening portion 54a is gradually reduced, as a position of the diameter moves on toward the image side, to become the portion of the smallest diameter which is represented by aperture stop S.

An outer circumferential surface of a flange portion of first lens L1 is fit in an inner circumferential surface of stepped portion 54g formed on the bottom surface of the top plate 54b, and thereby, the center of the opening portion 54a of the lens barrel 54 is positioned accurately to agree with an optical axis of the first lens L1. First annular portion L1a is formed on the flange portion of the first lens L1 to be closer to an image. Second annular portion L2a is formed to be closer to an object on the flange portion of the second lens L2 arranged on the first lens L1 to be closer to an image. By fitting an outer circumferential surface of the first annular portion L1a in an inner circumferential surface of the second annular portion L2a, it is possible to position the first lens L1 and the second lens L2 accurately so that their optical axes (L) may agree with each other. Light-shielding mask 22 is placed on the second lens L2 to be closer to an object. Though the light-shielding mask 22 is arranged to be in a clearance between the first annular portion L1a of the first lens L1 and the top face of the second lens L2, it does not affect a lens-to-lens distance between the first lens L1 and the second lens L2 which will be described later.

In the course of assembling, before the casing 53 is mounted, the first lens L1 and the second lens L2 are inserted, in this order, into the lens barrel 54 from the image side so that a top face of the first lens L1 may come in contact with the bottom face of the top plate 54b and the second annular portion L2a of the second lens may come in contact with a bottom surface of the first lens L1, and when this condition is kept, a lens-to-lens distance between the first lens L1 and the second lens L2 is settled. Further, by pressing press-fitting ring 23 into cylinder portion 54c from the image side so that it may come in contact with the bottom surface of the second lens L2, the first lens L1 and the second lens L2 are fixed in the lens barrel 54, while maintaining the aforementioned condition. Incidentally, adhesive may also be coated on a contact area between the press-fitting ring 23 and the lens barrel 54.

The lens barrel 54 in which the lenses are mounted is incorporated in the following way. First, the casing 53 is held by an unillustrated automatic assembling machine to be moved on image sensor 51 fixed on base board 52 where the casing 53 is arranged so that its center may agree with that of the image sensor 51. In addition, adhesive are coated on a contact area between the base board 52 and the casing 53 so that both of them may be unified solidly. After that, male screw 54d of the lens barrel 54 is engaged with female screw 53a of the casing 53, thus, the lens barrel 54 can be incorporated in the casing 53. In this case, focusing of image pickup optical system 10 is carried out by adjusting an amount of screwing the lens barrel 54 in the casing. At the stage where the lens barrel 54 is screwed in the casing to the appropriate position, adhesive are filled between the top plate 54b and the casing 53, and both of them are fixed.

In the embodiment of the invention, the casing 53 is glued on the base board 52 and the lens barrel 54 is glued on the casing 53, and IR cut filter 24 is further glued to cover opening portion 54a of the lens barrel 54. Therefore, it is possible to eliminate an adverse effect of foreign materials on photoelectric converting portion 51a, because an outside of an image pickup unit is kept to be sealed hermetically to block invasion of foreign materials. It is preferable that adhesive to be used for the foregoing have moisture-proof properties. Due to this, it is possible to prevent deterioration of the surface of a solid-state image sensor and a pad caused by invasion of moisture.

Since the IR cut filter 24 is arranged to be closer to the object than the first lens portion L1 is, the first lens portion L1 can be protected without being exposed, and sticking of foreign materials on the lens surface can be prevented.

Further, in the present embodiment, height H of image pickup unit 50 in the direction of an optical axis of an image pickup lens is 10 mm or less, which can contribute to thinning a cellphone terminal when the cellphone terminal described later is equipped with the image pickup unit.

Figure 4:
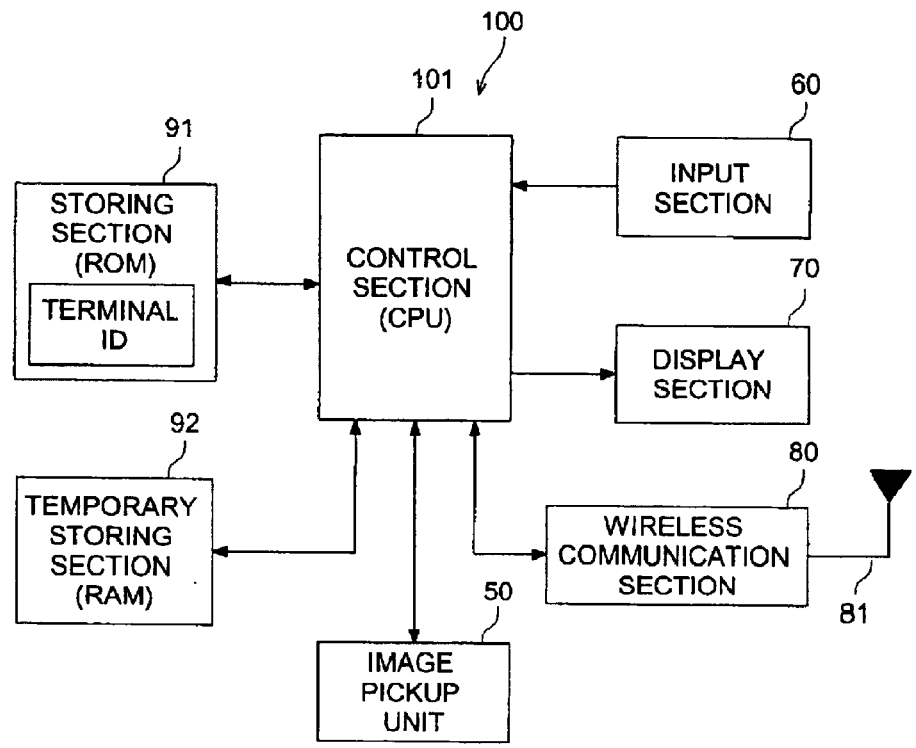
FIG. 4 is a control block diagram of cellphone 100.

Operations of the image pickup unit 50 of the present embodiment will be explained. FIG. 3(a) shows front view 3(a) and FIG. 3(b) shows rear view 3(b) each for cellphone 100 serving as a cellphone terminal equipped with image pickup unit 50. FIG. 4 is a control block diagram of cellphone 100.

The image pickup unit 50 is provided at the position corresponding to the lower portion of a liquid crystal display portion, with a side end surface of the casing 53 in an image pickup optical system being provided on the back (the liquid crystal display portion is assumed to be on the front) of cellphone 100. Terminal for connecting with the outside 59 of the image pickup unit 50 is structured to be connected with control portion 101 of the cellphone 100 and to output image signals such as luminance signals and color difference signals to the control portion 101.

Further, as shown in FIG. 4, the cellphone 100 is provided with control portion (CPU) 101 that controls each portion generally and executes a program corresponding to each processing, input portion 60 for indicating and inputting numbers by the use of a key, display portion 70 for displaying images picked up in addition to prescribed data, wireless communication portion 80 for realizing communication of various information with a server of each portion, storage portion (ROM) 91 that stores various necessary data such as a system program, various processing programs and terminal IDs and with temporary storing section (RAM) 92 that is used as a working area for storing temporarily various processing programs to be executed by control portion 101 and data, or processing data, or image pickup data by image pickup unit 50.

An object image formed on photoelectric converting portion 51a of image sensor 51 through the first lens L1 and the second lens L2 is converted photoelectrically there, and then, is processed by signal processing circuit 51b to become image signals. The image signals thus obtained can be stored in random-access memory 92, or displayed by the display portion 70, or further, transmitted to the outside as image information through wireless communication portion 80.

EXAMPLE

An example of an image pickup lens that can be used in the aforementioned embodiment will be shown below. Symbols to be used in each example are as follows.

f: Focal length of a total image pickup lens system fB: Back focus

F: F-number

2Y: Length of a diagonal line on an image pickup surface of a solid-state image sensor (a length of a diagonal line on a practical rectangle pixel area of a solid-state image sensor)

2ω: Angle of view in the diagonal line direction on an image pickup surface of a solid-state image sensor R: Radius of curvature D: Axial distance between surfaces Nd: Refractive index of lens material for d-line vd: Abbe's number A form of an aspheric surface in each example is shown by the following expression under the assumption that a vertex of the surface is the origin, X-axis is taken in the direction of an optical axis and h represents a height in the direction perpendicular to the optical axis;

$$X = \frac{h^2/R4}{1+\sqrt{1-(1+K4)h^2/R4^2}} + \sum A_i h^i$$

wherein, $A_i$ represents i-order aspheric surface coefficient, R represents a radius of curvature and K represents a conic constant.

Lens data relating to the image pickup lens in Example 1 are shown in Tables 1 and 2. Incidentally, hereafter (including lens data in the Tables), let it be assumed that a power multiplier of 10 (for example, $2.5 \times 10^{-3}$) is expressed by E (for example, 2.5×E-03).

TABLE 1

(Example 1)
F = 3.645 mm  fB = 1.264 mm  F = 2.88  2Y = 4.48 mm  2ω = 62°

| Surface No. | R (mm) | D (mm) | Nd | vd |
|---|---|---|---|---|
| Diaphragm | ∞ | 0.05 | | |
| 1 | 1.584 | 0.88 | 1.53040 | 56.0 |
| 2 | 2.938 | 1.34 | | |
| 3 | 2.534 | 1.04 | 1.53040 | 56.0 |
| 4 | 5.981 | | | |

TABLE 2

| | Aspheric surface coefficient |
|---|---|
| First surface | K = −0.53874 |
| | A4 = 2.0615 × E−02 |
| | A6 = 4.1166 × E−02 |
| | A8 = −2.9389 × E−02 |
| | A10 = −3.8763 × E−02 |
| | A12 = 6.3916 × E−02 |
| Second surface | K = 7.7203 |
| | A4 = 1.0376 × E−03 |
| | A6 = 5.3146 × E−02 |
| | A8 = −3.7600 × E−02 |
| | A10 = −2.6475 × E−02 |
| | A12 = 1.7524 × E−02 |
| Third surface | K = −10.530 |
| | A4 = 2.8711 × E−02 |
| | A6 = −2.1813 × E−02 |
| | A8 = −5.9831 × E−04 |
| | A10 = 3.2423 × E−03 |
| | A12 = −7.8812 × E−04 |
| Fourth surface | K = −0.38181 |
| | A4 = 1.7859 × E−02 |
| | A6 = −2.2050 × E−02 |

TABLE 2-continued

| | Aspheric surface coefficient |
|---|---|
| | A8 = 3.5122 × E−03 |
| | A10 = 1.5957 × E−04 |
| | A12 = −8.8692 × E−05 |

Figure 5:
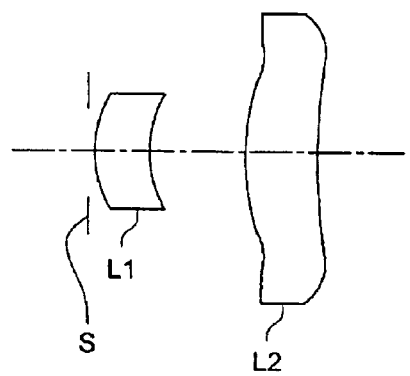
FIG. 5 is a sectional view of an image pickup lens of Example 1.
Figures 6A, 6B, 6C:
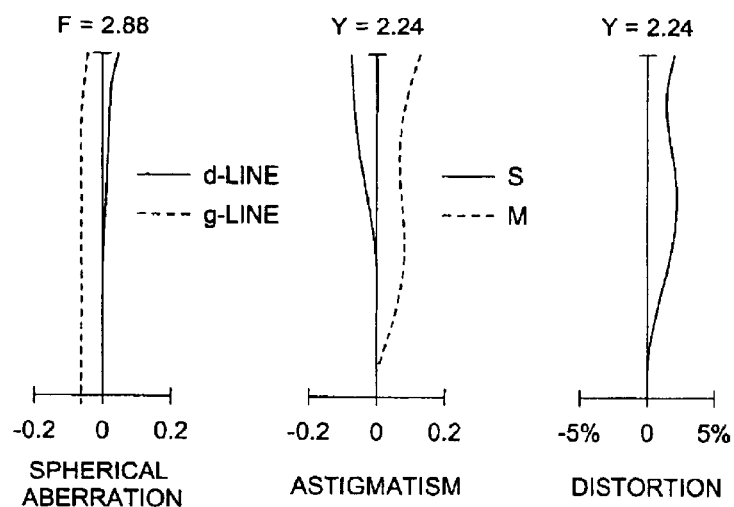
FIGS. 6(a)–6(d) show aberration diagrams (spherical aberration, astigmatism, distortion and meridional coma) in the image pickup lens of Example 1.
Figure 6D:
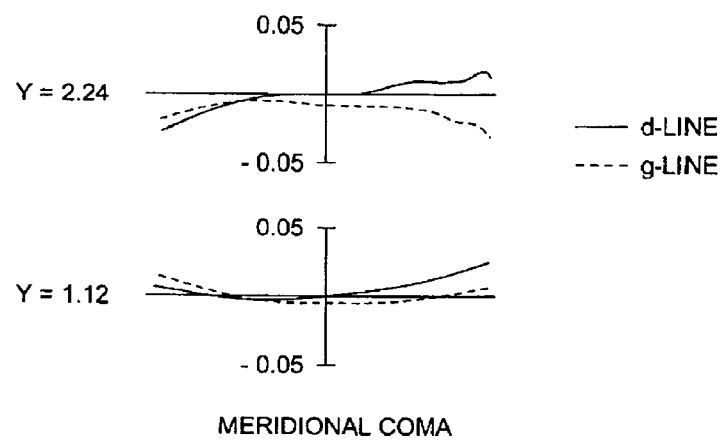

FIG. 5 is a sectional view of an image pickup lens of Example 1. In the figure, L1 represents the first lens, L2 represents the second lens and S represents an aperture stop. FIGS. 6(a)–6(d) show aberration diagrams (spherical aberration, astigmatism, distortion and meridional coma) in the image pickup lens of Example 1.

Lens data relating to the image pickup lens in Example 2 are shown in Tables 3 and 4.

TABLE 3

(Example 2)
F = 3.697 mm  fB = 0.520 mm  F = 2.88  2Y = 4.48 mm  2ω = 62°

| Surface No. | R (mm) | D (mm) | Nd | vd |
|---|---|---|---|---|
| Diaphragm | ∞ | 0.00 | | |
| 1 | 1.233 | 0.70 | 1.53040 | 56.0 |
| 2 | 2.105 | 1.34 | | |
| 3 | 2.063 | 0.75 | 1.53040 | 56.0 |
| 4 | 2.015 | 0.48 | | |
| 5 | ∞ | 0.30 | 1.51633 | 64.1 |
| 6 | ∞ | | | |

TABLE 4

| | Aspheric surface coefficient |
|---|---|
| First surface | K = −2.5343 × E−02 |
| | A4 = 4.6201 × E−02 |
| | A6 = −2.1490 × E−02 |
| | A8 = 1.1767 × E−01 |
| | A10 = −8.2221 × E−02 |
| | A12 = −4.2229 × E−02 |
| Second surface | K = 2.0997 |
| | A4 = 1.2628 × E−01 |
| | A6 = −7.4402 × E−03 |
| | A8 = 1.0127 × E−01 |
| | A10 = 5.4767 × E−01 |
| | A12 = −4.9024 × E−01 |
| Third surface | K = −7.0915 |
| | A4 = −5.3446 × E−02 |
| | A6 = −3.0395 × E−02 |
| | A8 = 3.0512 × E−02 |
| | A10 = −1.2492 × E−02 |
| | A12 = 8.4636 × E−04 |
| Fourth surface | K = −5.6539 |
| | A4 = −7.0762 × E−02 |
| | A6 = 1.3340 × E−02 |
| | A8 = −9.9594 × E−03 |
| | A10 = 3.6269 × E−03 |
| | A12 = −5.9190 × E−04 |

Figure 7:
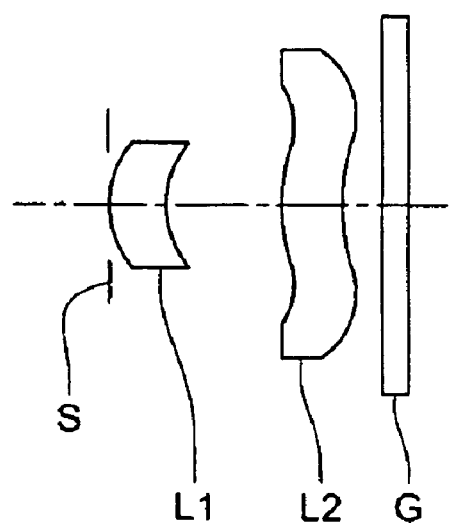
FIG. 7 is a sectional view of the image pickup lens of Example 2.
Figures 8A, 8B, 8C:
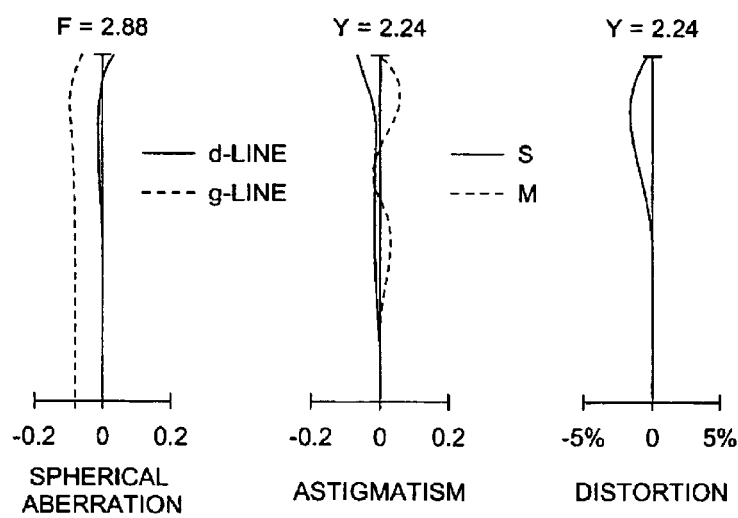
FIGS. 8(a)–8(d) show aberration diagrams (spherical aberration, astigmatism, distortion and meridional coma) in the image pickup lens of Example 2.
Figure 8D:
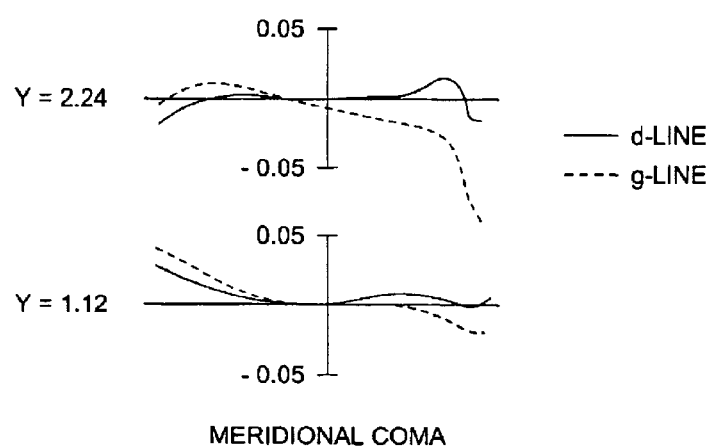

FIG. 7 is a sectional view of the image pickup lens of Example 2. In the figure, L1 represents the first lens, L2 represents the second lens, S represents an aperture stop and G represents a parallel flat plate such as an IR cut filter. FIGS. 8(a)–8(d) show aberration diagrams (spherical aberration, astigmatism, distortion and meridional coma) in the image pickup lens of Example 2.

Lens data relating to the image pickup lens in Example 3 are shown in Tables 5 and 6.

TABLE 5

(Example 3)
F = 2.552 mm fB = 0.426 mm F = 2.88 2Y = 3.04 mm 2ω = 62°

| Surface No. | R (mm) | D (mm) | Nd | vd |
|---|---|---|---|---|
| Diaphragm | ∞ | 0.00 | | |
| 1 | 0.924 | 0.60 | 1.53180 | 56.0 |
| 2 | 1.479 | 0.66 | | |
| 3 | 2.638 | 0.80 | 1.53180 | 56.0 |
| 4 | 8.748 | 0.30 | | |
| 5 | ∞ | 0.30 | 1.51633 | 64.1 |
| 6 | ∞ | | | |

TABLE 6

| | Aspheric surface coefficient | |
|---|---|---|
| First surface | K = | 0.43068 |
| | A4 = | 1.0104 × E−01 |
| | A6 = | −2.2140 × E+00 |
| | A8 = | 1.7451 × E+01 |
| | A10 = | −6.4700 × E+01 |
| | A12 = | 8.5980 × E+01 |
| Second surface | K = | 2.0193 |
| | A4 = | 4.7760 × E−01 |
| | A6 = | −3.2991 × E+00 |
| | A8 = | 2.1545 × E+01 |
| | A10 = | −5.5312 × E+01 |
| | A12 = | 5.6733 × E+01 |
| Third surface | K = | −57.557 |
| | A4 = | 7.1078 × E−02 |
| | A6 = | −3.2538 × E−01 |
| | A8 = | 4.0762 × E−01 |
| | A10 = | −4.1069 × E−01 |
| | A12 = | 1.7689 × E−01 |
| Fourth surface | K = | −1878.5 |
| | A4 = | 8.2258 × E−02 |
| | A6 = | −2.3147 × E−01 |
| | A8 = | 1.7029 × E−01 |
| | A10 = | −7.6584 × E−02 |
| | A12 = | 1.1578 × E−02 |

Figure 9:
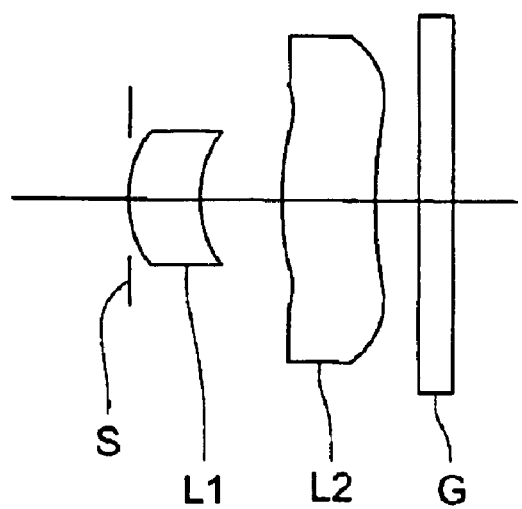
FIG. 9 is a sectional view of the image pickup lens of Example 3.
Figures 10A, 10B, 10C:
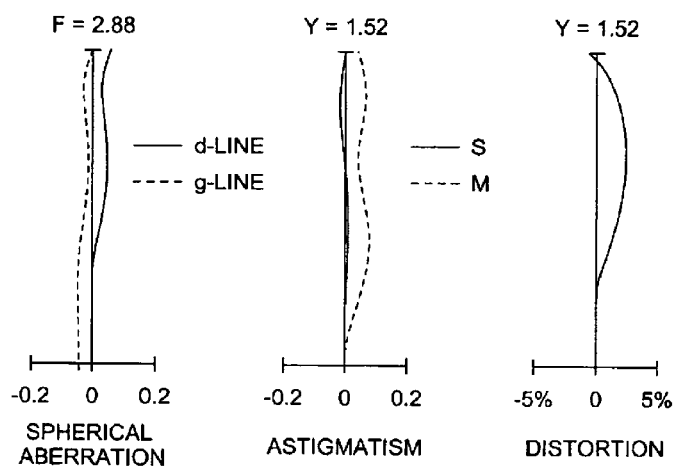
FIGS. 10(a)–10(d) show aberration diagrams (spherical aberration, astigmatism, distortion and meridional coma) in the image pickup lens of Example 3.
Figure 10D:
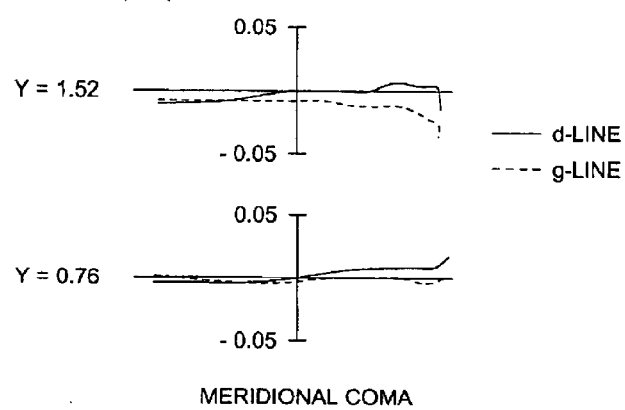

FIG. 9 is a sectional view of the image pickup lens of Example 3. In the figure, L1 represents the first lens, L2 represents the second lens, S represents an aperture stop and G represents a parallel flat plate such as an IR cut filter. FIGS. 10(a)–10(d) show aberration diagrams (spherical aberration, astigmatism, distortion and meridional coma) in the image pickup lens of Example 3.

Values of each Example corresponding to each conditional expression are shown in Table 7.

TABLE 7

| Expression | Example 1 | Example 2 | Example 3 |
|---|---|---|---|
| (1) f1/|f2| | 0.70 | 0.12 | 0.50 |
| (2) R2/((1 − N1) · f) | −1.52 | −1.07 | −1.09 |
| (3), (7) f1/f | 1.45 | 1.19 | 1.32 |
| (4), (6) X − X0 | h = hmax (2.10 mm) −0.6017 | h = hmax (1.84 mm) −0.8800 | h = hmax (1.30 mm) −0.2793 |
| | h = 0.7 × hmax −0.0640 | h = 0.7 × hmax −0.3582 | h = 0.7 × hmax −0.0210 |
| (5) $D_{24}$/f | 0.65 | 0.57 | 0.57 |
| (8) L/2Y | 1.02 | 0.89 | 1.01 |

In the aforementioned Examples 1–3, the first lens and the second lens are made of plastic materials of a polyolefin type, and a coefficient of saturated water absorption is 0.01% or less. Since a coefficient of saturated water absorption of a plastic lens is greater than that of a glass lens, the plastic lens is in a tendency that an uneven distribution of moisture absorption is caused transitionally when humidity is changed suddenly, resulting in uneven refractive index which makes it impossible to obtain satisfactory image forming ability. To inhibit deterioration of ability caused by humidity change, it is preferable to use plastic materials all indicating a coefficient of saturated water absorption of 0.7% or less.

Since the refractive index of plastic materials is changed greatly by temperature changes, there is a problem that a position of an image point of the total lens is fluctuated depending on temperatures when both of the first lens and the second lens are constituted by a plastic lens. In the image pickup unit wherein the image point fluctuation cannot be ignored, if a lens (for example, glass molded aspherical lens) formed with a glass material is made to be the first lens whose positive refracting power is great, the constitution may be one that lightens the problem relating to temperature characteristics.

Incidentally, the present example is not necessarily of a sufficient design in terms of telecentric characteristics of a light flux on the image side. The telecentric characteristic means that a principal ray of a light flux for each image point is substantially in parallel with an optical axis after emerging from the final lens surface, namely that a position of an exit pupil of the optical system is sufficiently away from the image surface. When the telecentric characteristic is worsened, a light flux enters a solid-state image sensor diagonally, and a phenomenon that a substantial vignetting factor is lowered on the peripheral portion of on image area (shading) is caused, resulting in insufficient brightness of edge of image field. In the recent technology, however, it is possible to lighten the shading phenomenon by reviewing arrangement of color filters for a charge coupled device and of a micro-lens-array. Therefore, the present example is a design example aiming the downsizing relating to the portion by which the demand for telecentric characteristics is eased.

The invention makes it possible to provide a small-sized image pickup lens wherein an angle of view is great and various aberrations are corrected satisfactorily in spite of a simple structure with two lenses, an image pickup unit and a cellphone terminal both employing the image pickup lens.

What is claimed is:

1. An image pickup lens comprising, in the order named from an object side:

(a) an aperture stop;
(b) a meniscus-shaped first lens having positive refracting power whose convex surface faces an object; and (c) a second lens having positive or negative refracting power whose convex surface faces the object, wherein each of the first lens and the second lens has at least one aspheric surface and satisfies the following conditional expression;

$$|f1/f2|<1.0$$

wherein, f1 is a focal length of the first lens, f2 is a focal length of the second lens and f is a focal length of an entire system of the image pickup lens.

2. The image pickup lens of claim 1, wherein the following conditional expressions are satisfied;

$$0.80<f1/f<1.80,$$

$$-1.90<R2/((1-N1)\cdot f)<-0.60$$

wherein R2 represents a radius of curvature of the image-side surface of the first lens, and N1 represents a refractive index of the first lens for d line.

3. The image pickup lens of claim 1, wherein the second lens has positive refracting power.

4. The image pickup lens of claim 1, wherein an image-side surface of the second lens has an aspheric surface satisfying the following conditional expression at optional height h in a direction perpendicular to an optical axis satisfying h max×0.7<h<h max when h max represents a maximum effective radius;

$$X-X0<0$$

wherein, X and X0 are values calculated by the following expressions under the condition that a vertex of the surface represents the origin, and an X axis is taken in an optical axis direction, where X represents an amount of displacement of the aspheric surface, $$X = \frac{h^2/R4}{1+\sqrt{1-(1+K4)h^2/R4^2}} + \sum A_i h^i$$

and X0 represents an amount of displacement of rotation secondary curved surface of aspheric surface, $$X0 = \frac{h^2/R4}{1+\sqrt{1-(1+K4)h^2/R4^2}}$$

wherein, Ai represents i-order aspheric surface coefficient of the image-side surface of the second lens, R4 represents a radius of curvature of an image-side surface of the second lens and K4 represents a conic constant of an image-side surface of the second lens.

5. The image pickup lens of claim 1, wherein the first lens and the second lens are made of plastic materials.

6. An image pickup lens comprising, in the order named from an object side:

(a) an aperture stop;
(b) a meniscus-shaped first lens having positive refracting power whose convex surface faces an object; and
(c) a second lens having positive or negative refracting power whose convex surface faces the object, wherein the following conditional expression is satisfied;

$$0.40<D_{24}/f<1.00$$

wherein, $D_{24}$ represents a distance from an image-side surface of the first lens to that of the second lens, and f represents a focal length of an entire image pickup lens system, and an image-side surface of the second lens has thereon an aspheric surface satisfying the following conditional expression at optional height h in the direction perpendicular to an optical axis satisfying h max×0.7<h<h max when h max represents the maximum effective radius;

$$X-X0<0$$

wherein, X and X0 are values calculated by the following expressions under the condition that a vertex of the surface represents the origin, and an X axis is taken in the optical axis direction, and X represents an amount of displacement of the aspheric surface, $$X = \frac{h^2/R4}{1+\sqrt{1-(1+K4)h^2/R4^2}} + \sum A_i h^i$$

and X0 represents an amount of displacement of rotation secondary curved surface of aspheric surface, $$X0 = \frac{h^2/R4}{1+\sqrt{1-(1+K4)h^2/R4^2}}$$

wherein, Ai represents i-order aspheric surface coefficient of the image-side surface of the second lens, R4 represents a radius of curvature of an image-side surface of the second lens and K4 represents a conic constant of an image-side surface of the second lens.

7. The image pickup lens of claim 6, wherein the following conditional expression is satisfied;

$$0.80<f1/f<1.80,$$

wherein f1 represents a focal length of the first lens.

8. The image pickup lens of claim 6, wherein the second lens has positive refracting power.

9. The image pickup lens of claim 6, wherein the first lens and the second lens are made of plastic materials.

10. An image pickup unit comprising:

(a) a solid-state image sensor equipped with a photoelectric converting portion;
(b) an image pickup lens for forming an object image on the photoelectric converting portion of the solid-state image sensor, the image pickup lens comprising, in the order named from an object side:
(1) an aperture stop,
(2) a meniscus-shaped first lens having positive refracting power whose convex surface faces an object, and
(3) a second lens having positive or negative refracting power whose convex surface faces the object, wherein each of the first lens and the second lens has at least one aspheric surface and satisfies the following conditional expression;

$$|f1/f2|<1.0$$

wherein, f1 is a focal length of the first lens, f2 is a focal length of the second lens and f is a focal length of an entire system of the image pickup lens;

(c) a base board having a terminal for connecting with an outside holding the solid-state image sensor and conducting transmission and receiving of electric signals; and (d) a casing composed of a light-shielding member, having an opening through which a ray enters from an object, wherein the solid-state image sensor, the image pickup lens, the base board, and the casing are formed integrally, and wherein a height of the image pickup unit in a direction of an optical axis of the image pickup lens is not more than 10 mm.

11. A cellphone terminal equipped with the image pickup unit described in claim 10.

* * * * *